United States Patent [19]

Jamieson et al.

[11] Patent Number: 4,506,827

[45] Date of Patent: Mar. 26, 1985

[54] BATTERY POWERED THERMOSTAT

[75] Inventors: J. Scott Jamieson; Henry A. Gleason, III, both of Goshen, Ind.

[73] Assignee: Johnson Service Company, Milwaukee, Wis.

[21] Appl. No.: 542,510

[22] Filed: Oct. 17, 1983

[51] Int. Cl.³ .............................................. F23N 5/20
[52] U.S. Cl. ................................. 236/46 R; 165/12; 307/66
[58] Field of Search ................. 236/46 R, 47; 165/12; 340/835.31, 429; 307/66

[56] References Cited

U.S. PATENT DOCUMENTS 4,428,528  1/1984  Renault .............................. 236/46 R

*Primary Examiner*—William E. Wayner

*Attorney, Agent, or Firm*—Larry L. Shupe; Joseph J. Jochman, Jr.; John Phillip Ryan

[57] ABSTRACT

The thermostat of the present invention includes a sensor for providing a signal representative of the actual temperature within a space. A microcomputer is coupled to the sensor and intermittently utilizes power at a first level when in an operating state for controllably generating output signals in response to the temperature signal. The microcomputer is adapted to be connected to a battery as a sole power source therefor. An isolating interface device such as an electromagnetic relay is coupled to the microcomputer and is adapted for connection to temperature-affecting equipment such as a heating or cooling system controller. The relay actuates the equipment in response to output signals from the microcomputer. A voltage detection circuit may optionally be provided for signalling a low battery voltage condition.

4 Claims, 5 Drawing Figures

BATTERY POWERED THERMOSTAT

FIELD OF THE INVENTION

This invention relates generally to thermostats for controlling the temperature within a space and more particularly, to thermostats which are powered solely by battery and which incorporate an isolation interface device for rendering the thermostat insensitive to the power or other electrical characteristics of the heating or cooling system controller connected thereto.

BACKGROUND OF THE INVENTION

Older, commonly employed temperature control systems utilize a passive, non-powered thermostat which typically includes a bimetal element or coil which senses the temperature within a space and which coacts with an electrical contact coupled to a two-wire control line for controlling only the heating function. A manual lever is provided for setting the desired temperature to be maintained and changes in the length of the bimetal element will cause the contact to either separate or electrically connect the wires comprising the control line, thereby energizing or disabling the controller which operates the heating system.

More recently and with the advent of small, economical digital circuit components including microcomputer integrated chips, means have been devised whereby such thermostats, requiring electrical power for their operation, may provide computational and control functions for permitting significant energy conservation. In particular, such thermostats enable the user to program the device to maintain a lower, energy-conserving temperature within the space during those hours or days when the occupants are absent or sleeping and a higher, more comfortable temperature at other times. Auxiliary or backup batteries are frequently employed in such thermostats to retain volatile memory in the event of a failure of the main power source. The inconvenience of re-programming is thereby avoided.

Thermostats of this type are coupled to a multiple wire control line which supplies power to the thermostat and which provides the interconnection means whereby the thermostat selectively operates the heating or cooling system controller. Typically, the system including the multiple wire control line is configured such that the thermostat must derive its operating power from the device being controlled through those same wires to which it is connected for performing control functions. An example of a thermostat which derives its power from the device being controlled is shown and described in U.S. Pat. No. 4,274,145. Another example of a thermostat which derives its power from the heating system being controlled and which includes a back up battery for microcomputer memory retention is described in U.S. Pat. No. 4,257,555.

With the advent of the triac, a solid state power switching device, product designers have recognized that such triacs may advantageously be incorporated within microcomputer based thermostats, within heating/cooling system controllers or both. It is known that a triac requires a predetermined minimum level of current flowing therethrough in order to maintain the triac in a conductive state. If switching triacs are employed only in the thermostat and if the thermostat derives its power from those same wires used to operate the system controller, care must be taken to assure that the controller connected thereto requires an operating current sufficiently high to maintain the triacs in a conducting state at those times dictated by the thermostat. Conversely, if triacs are employed only in the controller connected to the thermostat by wiring which is common to both power and control functions, design precautions must be taken to assure that the scavenging of power by the thermostat from the control line will not cause a malfunction in the controller. If triacs are used in both the thermostat and the controller, special provisions must be made to precisely, simultaneously control the switching points of the two sets of triacs, a difficult and relatively expensive control feat.

One approach to the design problem presented by the evolution of new solid state and integrated chip circuit components is shown and described in U.S. Pat. No. 4,298,946. The thermostat shown and described therein utilizes switched triacs to drive electromagnetic relays, the latter being used to selectively activate the heating or cooling system controller. These relays render a thermostat of this type insensitive to the electrical load characteristics of the controller since, insofar as the controller is concerned, the relays present one or more sets of mechanical contacts which are purely passive. However, a thermostat of this type must nevertheless derive its primary operating power from a separate alternating current source and must incorporate an additional power source, a backup battery, for retaining the digital microcomputer memory. Yet another approach to this design problem is shown in U.S. Pat. No. 4,300,199 which similarly uses triacs to drive output relays, but yet derives its operating power from either the heating or cooling unit to which it is connected or from a separate transformer.

While these thermostats have heretofore been generally satisfactory, they tend to be characterized by certain disadvantages. In particular, they are required to derive their operating power either from the device being controlled or from separate, dedicated AC power sources and additionally utilize batteries solely for the retention of microcomputer memory in the event of a power failure. A thermostat which utilizes an extremely low power microcomputer, which derives its operating and memory retention power solely from a battery, which incorporates an isolating interface device for rendering the thermostat and the load controller adapted to be coupled thereto insensitive to the electrical characteristics one to the other and which may be used to provide load-insensitive control by a control line having two or more wires would be a significant advance in the art.

SUMMARY OF THE INVENTION

In general, the thermostat of the present invention includes a sensor for providing a signal representative of the actual temperature within a space. A microcomputer is coupled to the sensor and intermittently utilizes power at a first level when in an operating state for controllably generating output signals in response to the temperature signal. The microcomputer is adapted to be connected to a battery as a sole power source therefor. An isolating interface device such as an electromagnetic relay is coupled to the microcomputer and is adapted for connection to temperature-affecting equipment such as a heating or cooling system controller. The relay actuates the equipment in response to output signals from the microcomputer. A voltage detection circuit may optionally be provided for signalling a low battery voltage condition.

It is an object of the present invention to provide a thermostat adapted to be connected to a battery as its sole power source.

Another object of the present invention is to provide a thermostat which is constructed and arranged so that the thermostat and the load controller adapted to be coupled thereto are each rendered insensitive to the electrical characteristics of the other.

Yet another object of the present invention is to provide a battery powered thermostat adapted to control the operation of temperature-affecting equipment by a two-wire control line.

Still another object of the present invention is to provide a thermostat which incorporates an electronic computing means capable of operation with extremely low power levels for compatibility with thermostat operation solely by battery power.

Another object of the present invention is to provide a battery powered thermostat which is programmable by the user. These and other objects of the present invention will become more apparent from the detailed description thereof taken with the accompanying drawing.

DETAILED DESCRIPTION OF THE PREFERRED EMBODIMENTS

Figure 1:
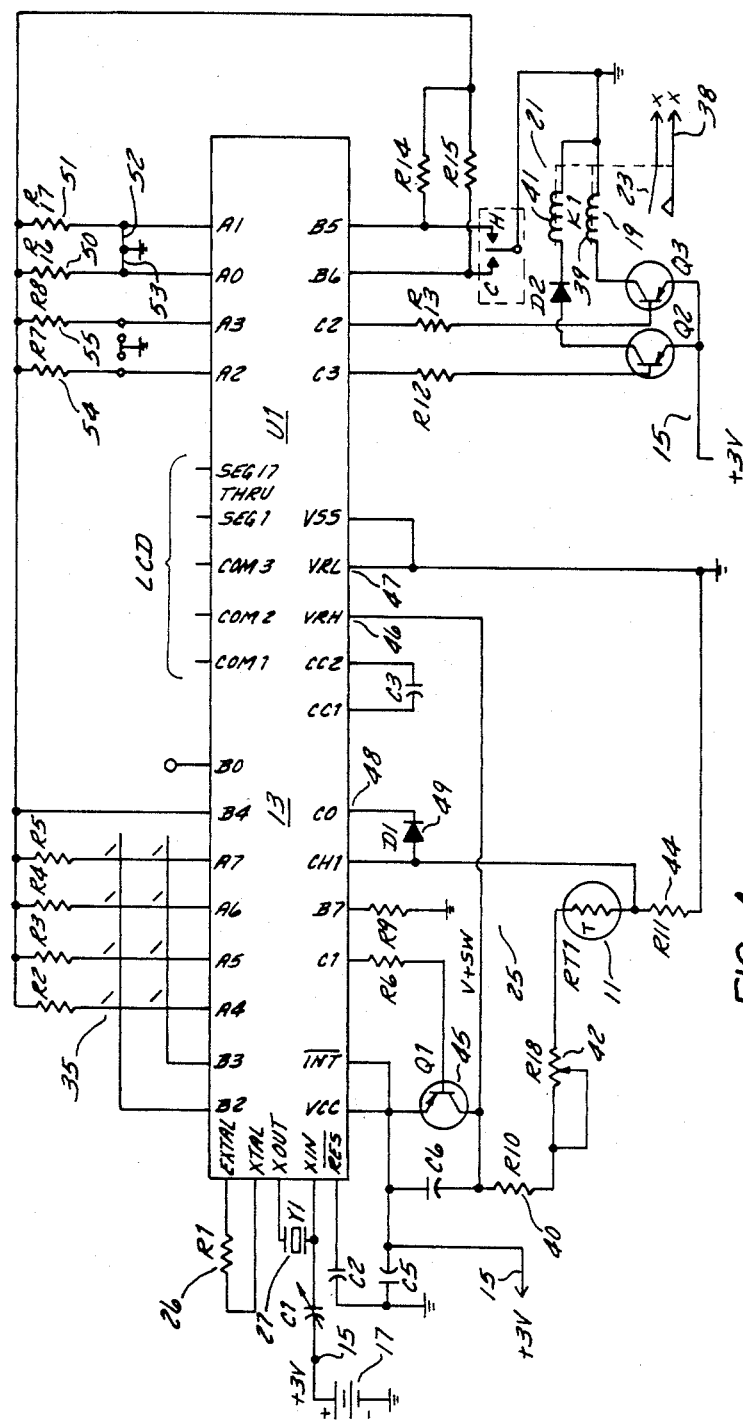
FIG. 1 is an electrical schematic diagram in accordance with a preferred embodiment of the invention.
Figure 5:
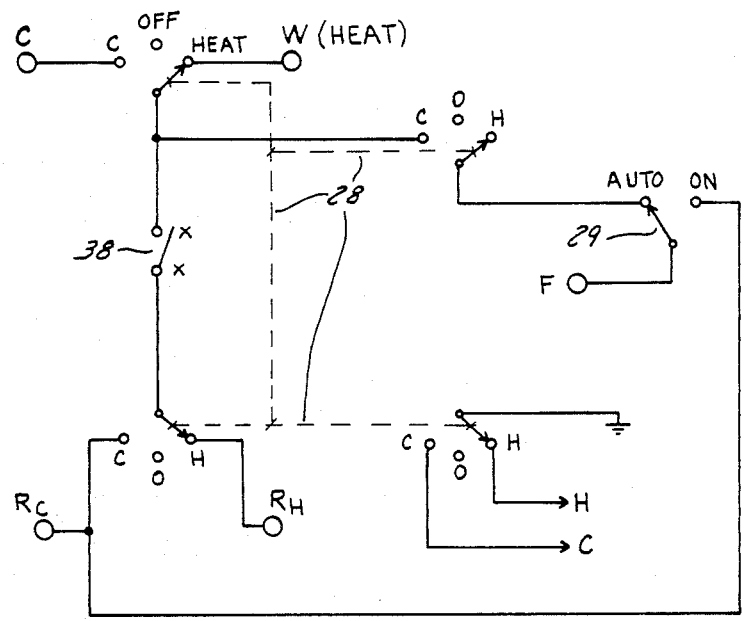
FIG. 5 is a schematic diagram showing the arrangement of the thermostat switches.

Referring first to FIG. 1, the thermostat 10 is shown to include a sensor 11 for providing a signal representative of the actual temperature within a space. An electronic computing means 13 such as a microcomputer is coupled to the sensor 11 and intermittently utilizes power at a first level when in an operating state for controllably generating output signals in response to the temperature signal. Points 15 are provided for connection to the positive terminal of an electric storage means 17 such as a battery as the sole power source for the thermostat 10, the negative terminal being connected to circuit ground. An isolating interface device 19 embodied as an electromagnetic relay includes operating coils 21 coupled to the microcomputer 13 and coacting mechanical contacts 23 connected to the switching circuit of FIG. 5. The interface device 19 actuates this equipment in response to the microcomputer output signals and because of the isolating function provided by the device 19, the thermostat 10 and the equipment controlled by it (not shown) are each made insensitive to the electrical characteristics of the other. A voltage sensing circuit 25 is optionally included for signalling a low battery voltage condition while an oscillator crystal 27 is coupled to the microcomputer 13 for generating signals used by the latter in connection with clocking functions. A resistor 26 forms a portion of an oscillator circuit at a nominal frequency of 400 KHZ for microprocessor functions which are not frequency-critical. Manually operated switches including a gang COOL-OFF-HEAT switch 28 and an AUTO-ON switch 29 are provided for selecting the thermostat operating modes.

While the microcomputer 13 may be programmed with a predetermined database generally suitable for most installations, it is desirable to provide means by which the thermostat user may program the device 13 with data specifically selected for the application and may further be provided with a visual indication of the data so selected. Accordingly and referring additionally to FIGS. 2 and 3, the thermostat 10 also includes switch means 35 connected to the microcomputer 13 for permitting the value modification of selected control parameters or data utilized by the microcomputer 13. Means 37 are also provided for displaying these control parameters.

More particularly, the sensor 11 is preferably a thermistor of the positive temperature coefficient type and includes in series therewith a range resistor 40 and a calibrating potentiometer 42. Such a sensor 11 will exhibit an electrical resistance which increases with a rising temperature of the air of the surrounding space and which thereby results in a voltage signal across the load resistor 44 which is representative of the actual space temperature. A preferred microcomputer 13 is of a type selected to function at extremely low power levels, whether at the first, operating level or the second, substantially lower wait state level.

Those of ordinary skill in the art will appreciate that the problem of providing adequate battery life in a thermostat 10 adapted to be powered solely thereby will require consideration of a number of factors including certain subjective factors. The factors to be considered include the power levels required by the microcomputer 13 at the operating and wait state levels and the frequency with which the microcomputer 13 is caused to scan the data stored in memory, make computations based thereon and selectively provide a change in output signal. The power levels and scanning and signal changing frequency will have a direct bearing upon the average power consumed by the thermostat 10. Yet another factor to be considered is the electrical energy level required to actuate the output interface device 19 used to operate the external controller and whether it is required to be continuously or only momentarily energized in order to effect controller operation. Other, subjective factors include the maximum physical size of the energy storage means 17 which is acceptable to a user and the minimum interval, in exemplary months or years, over which the user is required to replace the storage means 17. While an electric storage means 17 may include, for example, a capacitor, low cost and conveniently available dry cell batteries are preferred. It is therefore desirable to provide a satisfactory operating interval for battery replacement, perhaps up to two years, while utilizing batteries 17 of reasonably small size and capacity and yet provide for a frequency of microcomputer scanning and computation, all of which will result in the quality of temperature regulation, thermostat physical size and interval of battery replacement which is acceptable to a user.

In order to provide a thermostat having a physical size acceptable to most users, it is preferred that the maximum total space occupied by the electric storage means 17 be equivalent to that occupied by two standard "D" size 1.5 V. dry cell batteries. However, a preferred battery includes a pair of 1.5 V. "C" size batteries connected in series. Utilizing a pair of "C" size batteries, it is anticipated that battery replacement will be required no more frequently than about once each twelve months in normal thermostat operation.

Microcomputers of the CMOS, NMOS or IIL type are among those which could provide acceptably low power characteristics. While the microcomputer 13 disclosed herein is intended to operate at 3VDC, it is to be appreciated that other, very low power microcomputers having different operating voltages would be equally suitable. Further, it is preferred to program the microcomputer 13 to cause it to periodically scan the switches 35 and the sensor 11 for detecting switch positions and sensor output signals. This scanning activity may be made to occur every four minutes, for example, when the switch 28 is set to a deactive or "off" position and every sixty seconds when the switch is set to an active heating or cooling control status. In the alternative, the microcomputer 13 may be programmed to scan switch positions at a rate different from that used to scan sensor output signals. Yet another approach is to program the microcomputer 13 to conduct scanning activity at a particular rate when battery voltage is at or above a predetermined level and another, lower rate when battery voltage is below that level but yet is sufficiently high to maintain the thermostat 10 in a fully operative state.

An isolating interface device 19 which is adapted to be coupled to the heating or cooling equipment by a control line may be embodied as an electromagnetic relay having at least one operating coil and a set of mechanical contacts actuated by the coil for maintaining the two wires comprising the control line 38 in electrical separation when the relay is de-energized or for connecting the wires together when the relay is continuously energized. It is apparent that the precise configuration of the electromagnetic relay may have an impact upon the power capacity and physical size of the battery utilized and/or upon battery life. A preferred interface device 19 will be configured as a latching type electromagnetic relay which includes a first, latching coil 39 and a second, unlatching coil 41. The momentary energization of either coil 39 or 41 will switch the contacts 23 to either a latched-closed position or an unlatched-open position. Either coil 39 or 41 may thereby be only momentarily energized and battery power will be conserved.

It is to be appreciated that the control line (not shown) used to couple the thermostat 10 to heating and/or cooling equipment may include two or more wires connected between the equipment and certain of the contacts while yet retaining the advantages of battery power and of mutual thermostat-controller electrical insensitivity. However, in its simplest, least costly and most commonly occurring form, the control line will include only two wires coupled to a heating controller.

A voltage sensing circuit 25 for signalling a low battery voltage condition is desirable for alerting the user when replacement will soon be required and includes a transistor 45 for periodically coupling the battery positive point 15 to a high voltage reference terminal 46 at the microcomputer 13 which divides the difference between the normal 3VDC voltage at terminal 46 and that voltage at terminal 47 into 256 reference levels (8 bit A/D conversion). The microprocessor is programmable to periodically connect terminal 48 to ground, the voltage across the temperature indicating resistor 44 is periodically established at 0.6VDC, the voltage drop across the diode 49. This diode voltage is resolved to a level count of nominally 20% of 256 or 51. As battery voltage and therefore its actual reference level declines, the voltage across resistor 44 becomes an increasingly higher percentage of the then-existing battery voltage. When this voltage reaches a sufficiently high level to be represented by a predetermined count or percentage, the microcomputer 13 will cause a warning signal to be displayed to alert the user that battery replacement will soon be necessary and the microcomputer 13 may also effect changes in the manner in which it controls the load. As an example of such a change, the microcomputer 13 may be programmed to change to a different control algorithm.

The parallel resistor network including resistors 50 and 51 are connectable to provide function options. That is, if the line 52 is opened, the thermostat 10 will function as a 24 hour, °F. unit while if the line 53 is opened, it will function as a 24 hour, °C. unit. If both lines 52, 53 are connected as shown, the thermostat 10 will function as a 12 hour, °F. unit. Jumpers installable between either the resistor 54 or resistor 55 permit the user to select a thermostat cycle rate, e.g., 5 cycles per hour for electric heating equipment or 3 cycles per hour for gas-fired equipment.

In a preferred embodiment of the thermostat 10 of the present invention, it is desirable that it be constructed and arranged to permit the user to modify, enter or simply display certain selected control parameters in the program database. In particular, it is desirable to provide means by which functions or data related to TEMPERATURE INCREASE, TEMPERATURE DECREASE, TEMPERATURE HOLD, PROGRAM COPY, REVIEW, NEXT DAY, END TIME LAYER and END TIME EARLIER may be modified, displayed, manipulated or entered. While this suggests that eight switches be provided for the enumerated control parameters, it has been found that the inclusion of such a relatively large number of switches can be dismaying to the uninitiated user. Accordingly, it is preferable to embody the thermostat 10 with a plurality of dual function switches 35 with the number of switches being equal to one-half of the number of control parameters to be modified, displayed or otherwise manipulated by the user. When so arranged, the thermostat 10 will provide a high degree of flexibility in use and yet the perception of the user will be of a thermostat 10 having an acceptably small and minimally confusing number of switches 35.

Figure 2:
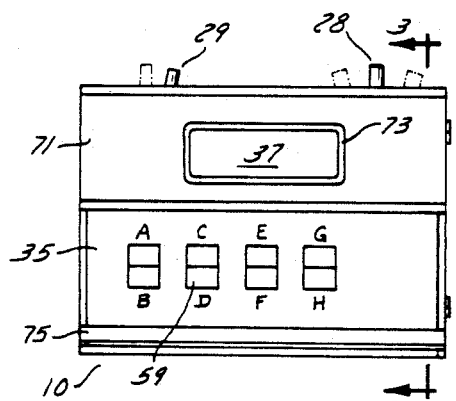
FIG. 2 is a front elevation view of the thermostat of the invention with its protective cover pivoted outwardly toward the viewer.
Figure 3:
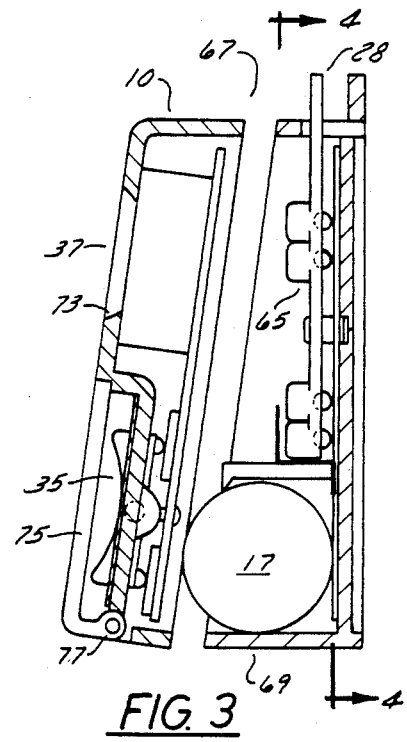
FIG. 3 is a cross-sectional side elevation view of the thermostat of FIG. 2 taken along the plane 3—3 thereof and with protective cover pivoted closed.
Figure 4:
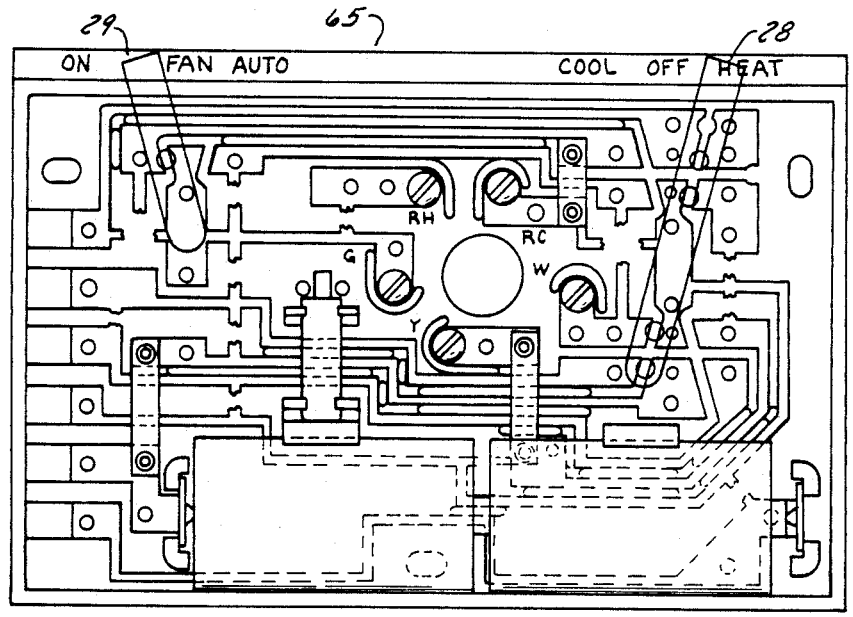
FIG. 4 is a front elevation view, partly in phantom, of the punch-formed circuit board of the thermostat taken along the line 4—4 of FIG. 3.

Referring to FIGS. 1, 2 and 3, the thermostat 10 is shown to include a plurality of dual function switches 35 of the spring-centered rocker type. Certain switches such as switch 59 are depressible in a first direction for manipulating a control parameter, TEMPERATURE HOLD, and in a second direction for manipulating another control parameter, PROGRAM COPY. In the case of TEMPERATURE INCREASE/TEMPERATURE DECREASE parameters, depression of the related switch in a first direction will increase the value of the displayed parameter while depression in a second direction will decrease its value. It is apparent, then, that the user may modify, display or otherwise manipulate two control parameters by appropriately touching only a single operating surface on a switch 35. Rather than require the user to repetitively depress any switch 35 in a first direction or in a second direction for incremental parameter modification or display, it is likewise desirable to program the microcomputer 13 such that, as a switch 35 is depressed continuously in a direction, the related parameter will change by slewing; that is, the parameter will be momentarily displayed by the display means 37, liquid crystal display for example, and then automatically indexed in sequential steps spaced by short, predetermined time intervals. The parameter is continuously displayed, the user may visually note the indexing value of each parameter and may select a new parameter value by simply releasing the switch when the desired value appears.

While the inventive thermostat 10 may be configured to control only a heating system or only a cooling system, a preferred thermostat 10 will include an isolation interface device 19 having a normally open mechanical contact and a function switch 28 for selecting an active status for either the heating or the cooling mode or a deactivated "off" status. Additionally, a fan AUTO-ON switch 29 may be optionally provided for causing an air-moving fan to be operated either continuously or intermittently, the latter only when the system controller is energized.

While the thermostat 10 will be fully operative even though its punch-formed circuit board 65 embodying the schematic diagram and its other components are exposed, it is preferable to include a housing 67 for aesthetic reasons and for protecting the components, particularly the switches 35, from inadvertent contact. A preferred housing 67 includes a removable wall plate cover 69, a front bezel 71, a window 73 for permitting the liquid crystal display 37 to be seen by the user and a front cover 75 pivotably hinged along its lower horizontal edge 77 for protecting the switches 35 from accidential contact when closed and for permitting manipulation of the switches 35 when open.

The following components have been found to be useful in the thermostat of the present invention; resistance is in ohms, tolerance 5% and capacitance is in microfarads, tolerance 10%, unless otherwise specified.

| FIG. 1 | | | |
|---|---|---|---|
| R1 | 1200 | R2-R9, R12-R17 | 10K |
| R10 | 470 | R11 | 10K |
| Q1, Q2, Q3 | 2N5190 | R18 | 500 |
| RT1 | 10K at 25° C. | D1, D2 | 1N4148 |
| C1 | 12pf | C2 | 1.5 |
| C3 | 100pf | C5, C6 | 0.1 |
| Y1 | 32.768KHZ | | |
| Battery - two "C" size in series | | U1 | 63L05 |
| LCD | 3 level multiplex type | | |

While only a few embodiments of the thermostat of the present invention have been shown and described, they are not intended to be limited thereby but only by the scope of the claims which follow.

We claim:

1. A battery powered thermostat including:
a sensor for providing a signal representative of the actual temperature within a space;
a microcomputer connected to said sensor and intermittently utilizing power at a first level when in an operating state for controlling an isolating interface relay in response to said temperature signal;
a voltage sensing circuit connected to said microcomputer and including a temperature indicating resistor, said sensing circuit and said microcomputer being adaptable to periodically compare a voltage across said resistor with the voltage of a battery and generate a signal when said resistor voltage is equal to a predetermined percentage of said battery voltage, and;
a network connected to said microcomputer for permitting the conversion of said thermostat between Fahrenheit and centigrade control modes.

2. The invention set forth in claim 1 wherein said thermostat further includes a network connected to said microcomputer for permitting a user to select a thermostat cycle rate corresponding to the type of heating equipment to be controlled by said thermostat.

3. A battery powered thermostat including:
a sensor for providing a signal representative of the actual temperature within a space;
a microcomputer connected to said sensor and intermittently utilizing power at a first level when in an operating state for controlling an isolating interface relay in response to said temperature signal;
a network connected to said microcomputer for permitting the conversion of said thermostat between Fahrenheit and centigrade control modes;
a network connected to said microcomputer for permitting a user to select a thermostat cycle rate corresponding to the type of heating equipment to be controlled by said thermostat;
a plurality of switches connected to said microcomputer and operable by a user, at least one of said switches being operable for permitting said user to select any combination of clock times between which said thermostat may alternately function in a setback mode or in a comfort mode.

4. A battery powered thermostat including:
a sensor for providing a signal representative of the actual temperature within a space;
a microcomputer connected to said sensor and intermittently utilizing power at a first level when in an operating state for controlling an isolating interface relay in response to said temperature signal;
a voltage sensing circuit connected to said microcomputer and including a temperature indicating resistor, said sensing circuit and said microcomputer being adaptable to periodically compare a voltage across said resistor with the voltage of a battery and generate a signal when said resistor voltage is equal to a predetermined percentage of said battery voltage;
a network connected to said microcomputer for permitting the conversion of said thermostat between Fahrenheit and centigrade control modes;
a network connected to said microcomputer for permitting a user to select a thermostat cycle rate corresponding to the type of heating equipment to be controlled by said thermostat;
a housing for enclosing said sensor, said microcomputer, said sensing circuit and said networks, said housing including a window for permitting the display of visual signals representative of time and temperature and a cover pivotably mounted for permitting the selective exposure and actuation of switches operable by a user.

* * * * *

UNITED STATES PATENT AND TRADEMARK OFFICE
CERTIFICATE OF CORRECTION

PATENT NO. : 4,506,827
DATED : March 26, 1985
INVENTOR(S) : J. Scott Jamieson, Henry A. Gleason, III It is certified that error appears in the above-identified patent and that said Letters Patent are hereby corrected as shown below:

Column 6, line 39, "LAYER" should be --LATER--

Signed and Sealed this

Thirteenth Day of August 1985

[SEAL]

Attest:

DONALD J. QUIGG

Attesting Officer Acting Commissioner of Patents and Trademarks